__United States Patent Office__

3,632,809
Patented Jan. 4, 1972

3,632,809
VINTIAMOL ESTERS
Franco D'Alo and Arnaldo Masserini, Milan, Italy, assignors to Warner-Lambert Company, Morris Plains, N.J.
No Drawing. Filed Dec. 3, 1968, Ser. No. 780,909
Claims priority, application Italy, Aug. 2, 1968, 19,759/68
Int. Cl. C07d 51/42
U.S. Cl. 260—240 J    20 Claims

ABSTRACT OF THE DISCLOSURE

O-esters, particularly the alkanoyl, cycloalkylalkanoyl, phenylalkanoyl, carboxyalkanoyl and phosphate esters of both the cis and trans forms of vintiamol (S-benzoylvinylthiamine) have been prepared. These esters exhibit a great enhancement of the vitamin $B_1$ activity of the starting vintiamol, said enhancement being particularly marked in case of the formate, acetate and phosphate esters.

---

The present invention relates to esters of vintiamol, to a process for their preparation and to pharmaceutical compositions containing said esters as active ingredients.

Vintiamol is the International Non-Proprietary Name for the S-benzoyl vinyl derivative of open form thiamine, a compound with high vitamin $B_1$ activity having the following structural formula:

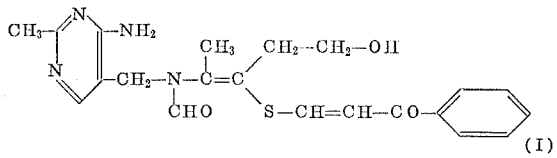

(I)

Owing to the cis-trans configuration of its vinyl chain, vintiamol can exist in two isomeric forms which can be separately obtained by properly selecting the reaction conditions. Both the isomers possess vitamin $B_1$ activity, but the trans-form appears to be more active than the corresponding cis-form (Gazzetta Chimica Italiana, 97, 1770; 1967).

It has now been found that by operating under particular conditions it is possible to esterify the primary hydroxyl of vintiamol thus obtaining O-esters which have been found to exhibit enhanced vitamin $B_1$ activity. This enhancement of activity occurs in both the cis and trans forms of vintiamol but not in the same extent. It is much more pronounced in the esters deriving from cis-vintiamol than in the corresponding esters obtained from trans-vintiamol. So, in the series of the esters the higher activity is displayed by the cis-form, contrary to the parent alcohol.

The new vintiamol esters of the present invention are characterized by the following general formula

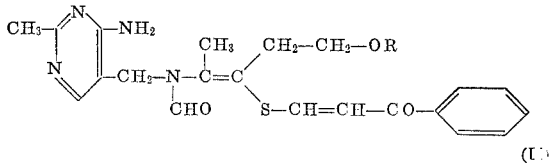

(II)

where R represents a hydrocarbon acyl group having from 1 to 9 carbon atoms or an orthophosphate group

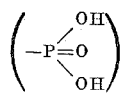

The invention also includes the non-toxic addition salts of the compounds of Formula II above.

The Formula II is intended to embrace both the cis and trans isomers as well as mixtures of said isomeric forms.

The term "hydrocarbon acyl group having from 1 to 9 carbon atoms" includes unsubstituted straight and branched chain alkanoyl groups containing up to 9 carbon atoms such as formyl, acetyl, propionyl, butyryl, valeryl, isovaleryl, caproyl, oenanthoyl; aroyl groups typically benzoyl and lower alkyl substituted benzoyl from 7 to 9 carbon atoms such as benzoyl or o-, m-, or p-toluyl; cycloalkyl-alkanoyl groups, in which "alkanoyl" has the same meaning as defined above and "cycloalkyl" means saturated monocyclic groups having 3 to 8 carbon atoms such as cyclopentyl-formyl, cyclopentyl-acetyl, cyclopentyl-propionyl, cyclohexyl-acetyl and the like; phenyl alkanoyl groups, in which alkanoyl has the same meaning as defined above, such as phenyl-acetyl or phenyl-propionyl; and also acyl residues of aliphatic dicarboxylic acids, such as hemimalonyl or hemisuccinyl. Formyl and acetyl groups are particularly preferred.

The non-toxic addition salts include the non-toxic physiologically acceptable acid addition salts with organic or inorganic acids such as, for example, hydrochloric, hydrobromic, hydriodic, sulphuric, phosphoric, acetic, propionic, lactic, oxalic, succinic, maleic, tartaric, citric, benzoic, mandelic, p-toluene-sulphonic, methanesulphonic, salicylic acid and the like, the hydrochloric acid addition salts being particularly preferred. These non-toxic addition salts are also included within the scope of this invention.

The new vintiamol esters of the present invention are readily adsorbed by oral administration and their adsorption is substantially proportional to the dosage thus permitting to reach high vitamin $B_1$ blood levels in animals and also in man.

The capacity of the new vintiamol esters to promote very high thiamine blood levels was demonstrated in rats by orally administering compounds of the invention in a single dose of $2.5\mu$ moles. The hematic thiamine was measured in samples of blood drawn 30 minutes after this administration.

In Table I there are reported the average values (in $\gamma/ml.$) of thiamine determined in every sample. The trans-form of vintiamol was utilized as standard compound.

TABLE I

| Compound: | Blood thiamine $\gamma/ml.$ |
|---|---|
| Vintiamol (trans-form) | 78.2±3.8 |
| Vintiamol O-formate (cis-form) | 314±7.8 |
| Vintiamol O-acetate (cis-form) | 211.5±9.4 |
| Vintiamol O-propionate (cis-form) | 170±7.6 |
| Vintiamol O-valerate (cis-form) | 178±7.4 |
| Vintiamol O-benzoate (cis-form) | 101±3.8 |
| Vintiamol O-phosphate (cis-form) | 112±17.5 |
| Vintiamol O-valerate (trans-form) | 125±4.8 |

The results of this experiment confirm that the vintiamol esters of the present invention provide much higher thiamine blood levels than the free vintiamol.

In man the capacity to induce high thiamine blood levels was determined for a representative compound of the invention, the phosphate of the cis-form of vintiamol, in comparison with both the cis and trans forms of the corresponding free alcohol. For this purpose, the compounds under examination were administered by oral route in a single dose of $330\mu$ moles to healthy men whose hematic thiamine was measured in samples of blood drawn 2, 4 and 8 hours after the administration.

In Table II there are reported (in $\gamma/ml.$) the average values of thiamine determined in every sample.

TABLE II

| Compound | Blood thiamine (γ/ml.) after— | | |
|---|---|---|---|
| | 2 hr. | 4 hr. | 8 hr. |
| Cis-form of vintiamol phosphate | 27.1 | 28.2 | 17.9 |
| Cis-form of vintiamol | 11.03 | 10.86 | 6.18 |
| Trans-form of vintiamol | 22.86 | 21.43 | 9.73 |

It appears from this table that the cis-vintiamol O-ester of this invention exhibits enhanced vitamin $B_1$ activity being able to produce thiamine blood levels higher than those produced by both the corresponding isomeric free alcohols. In this connection the new compound is at least twice as active as the corresponding cis-vintiamol and even much more active than trans-vintiamol. The enhancement of activity of the cis-form of vintiamol by by esterification is of remarkable practical importance because it permits the practical use of cis-vintiamol which is much easier to be prepared and purified than the corresponding trans-form.

In view of their high vitamin $B_1$ activity the new vintiamol esters of the present invention may usefully be employed both as nutritional supplements for foods and animal feedstuffs and for therapeutic purposes. Particularly they can be associated with a pharmaceutical carrier to obtain pharmaceutical compositions for oral or parenteral administration which can be used for the treatment of conditions resulting from vitamin $B_1$ deficiency.

These compositions can be administered as syrups in which the active ingredients are mixed with sweetening, flavouring, preserving and emulsifying agents; further the active ingredients can be mixed with talc, stearic acid, magnesium stearate, lactose, calcium carbonate, starch or like substances to prepare tablets, pills or other forms suitable for oral use. Compositions for parenteral use are prepared by mixing the active ingredients with liquid carriers, for example water, glycols or vegetable oils to obtain injectable solutions or suspension. The compositions may also be presented as suppositories in which the active ingredients are mixed with suppository bases, for example cocoa butter, beeswax, higher aliphatic alcohols, glycols, cholesterol, zinc stearate and like.

The compositions may be in dosage unit form containing the active ingredient in an amount of from 5 to 250 mg. The administration is advantageously in equal doses one or more times daily to give a daily dosage of from 15 to 1000 mg., and preferably from 30 to 500 mg.

The new compounds of the present invention can be prepared by reacting vintiamol with an esterifying agent, such as, for example, an anhydride, and acyl halide, typically acyl chloride or a free acid, under mild conditions.

Generally the compounds of Formula II are prepared by heating the compound of Formula I with an acid anhydride, such an acetoformic anhydride or acetic anhydride, in a pyridine base, preferably pyridine itself. The formic acid esters are preferably prepared by reaction with 99% formic acid at a temperature of 30–80° C.

The phosphate esters (Formula II,

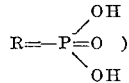

are prepared by reacting vintiamol with β-cyanethylphosphate, preferably at room temperature, in pyridine and in the presence of a dehydrating and condensing agent such as, for example, N,N'-dicyclohexylcarbodiimide to obtain a novel vintiamol β-cyanethylphosphate intermediate of formula:

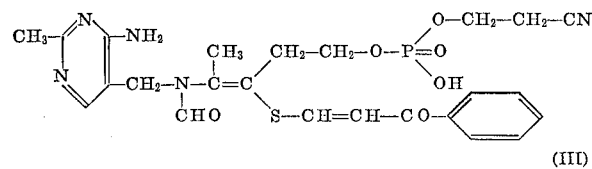

(III)

This β-cyanethylphosphate, in its trans or, preferably, in its cis form as well as in form of mixtures of said isomers, is also included within the scope of this invention.

This interemdiate is then hydrolyzed in an alkaline medium under mild conditions to effect cleavage of the β-cyanethyl group and formation of the desired vintiamol phosphate.

If desired, the vintiamol esters can be converted into their non-toxic addition salts according to known procedures, for example by reacting the bases with an aqueous or alcoholic solution of the appropriate mineral or organic acid.

In order further to illustrate the invention the following examples are given.

EXAMPLE 1

5 g. of vintiamol (cis-form) dissolved in 15 ml. of 99% formic acid are maintained at 50° C. for two hours. The solution is concentrated in vacuo until a half volume, then is poured into a saturated aqueous solution of sodium bicarbonate. The pitchy precipitate which separates is taken up with chloroform and the solution thus obtained is washed first with an aqueous solution of sodium bicarbonate and then with water. After evaporation of the solvent the residue is taken up with an ethanol-diethyl ether mixture (1:9). There is so obtained the vintiamol O-formate (cis-form) which, after crystallization from ethanol, melts at 136–139° C. Yield: 4 g.

By treating this compound with a solution of hydrochloric acid, the corresponding hydrochloride is obtained.

EXAMPLE 2

To 2.060 g. of vintiamol (cis-form) dissolved in 400 ml. of anhydrous pyridine there are added 2.55 g. of acetic anhydride, then the solution is maintained at room temperature for 48 hours. The solvent is evaporated in vacuo to dryness, then the residue is taken up with chloroform and the solution thus obtained is washed with water to neutral. After evaporation of the solvent there is obtained an oily residue which after digestion in an ethanol-ether mixture (1:9) gives the vintiamol O-acetate (cis-form). The product crystallized from ethanol melts at 120–122° C. Yield: 1 g.

500 mg. of the compound so obtained are dissolved in little water and treated with dilute hydrochloric acid. The solution is evaporated and the residue is recrystallized from ethanol to obtain the hydrochloric acid addition salt of vintiamol O-acetate (cis-form); M.P. 159–161° C.

In analogous manner, but operating with oxalic acid in alcoholic solution, the corresponding oxalic acid addition salt of vintiamol O-acetate (cis-form) is obtained; M.P. 170–173° C. Similarly the hydrobromic, phosphoric, tartaric, lactic and methanesulphonic acid addition salts are obtained.

EXAMPLE 3

By treating 6.18 g. of vintiamol (cis-form) with 9.74 g. of propionic anhydride in 1700 ml of pyridine and following the procedure set forth in Example 2 there are obtained 2.5 g. of vintiamol O-propionate (cis-form); M.P. 102–105° C.

EXAMPLE 4

To a solution of 2.06 g. of vintiamol (cis-form) in 400 ml. of anhydrous pyridine there are added 1.86 g. of valeric anhydride. By operating as in Example 2 there are obtained 2.3 g. of vintiamol O-valerate (cis-form); M.P. 142–144° C. By treatment with an aqueous solution of hydrochloric acid as described in Example 2 the hydrochloric acid addition salt of vintiamol O-valerate (cis-form) is obtained.

By treating, under the same conditions, a pyridine solution of vintiamol (cis-form) with butyric anhydride, caproic anhydride and enanthic anhydride, there are obtained the O-butyrate, the O-caproate and the O-enanthate of the vintiamol (cis-form) which are converted into the corresponding hydrochlorides.

EXAMPLE 5

To a solution of 4.12 g. of vintiamol (cis-form) in 900 ml. of anhydrous pyridine there are added 11.3 g. of benzoic anhydride. The reaction mixture is maintained at 50° C. for 48 hours, then evaporated to dryness. The oily residue is purified with hexane and left to solidify. There is so obtained the vintiamol O-benzoate (cis-form) which, after crystallization from ethanol, melts at 170–173° C. It may occur that though operating under the same conditions the product is obtained in a lower melting form (115–118° C.) which can be converted into the higher melting more stable form by prolonged heating in alcoholic solution.

In analogous manner, the o-toluate, the phenylacetate, the phenylpropionate and the cyclopentylpropionate of vintiamol (cis-form) are obtained.

By treating an alcoholic solution of the above compounds with benzoic or salicylic acid, the corresponding addition salts are obtained.

EXAMPLE 6

3.3 g. of succinic anhydride are added to a solution of 12.36 g. of vintiamol (cis-form) in 900 ml. of pyridine and the mixture is maintained at 60° C. for an hour. By operating as described in Example 2 there is obtained the vintiamol O-hemisuccinate (cis-form); M.P. 190–192° C.

In an analogous manner the corresponding hemimalonate is obtained.

EXAMPLE 7

A solution of 5 g. of vintiamol (trans-form) in 15 ml. 99% formic acid is maintained at 50° C. for two hours. By operating as in Example 1 vintiamol O-formate (trans-form) is obtained; M.P. 126–129° C. Yield: 4.1 g.

By treating this compound with a solution of hydrochloric acid, the corresponding hydrochloride is obtained.

EXAMPLE 8

To a solution of 13.7 g. of vintiamol (trans-form) in 50 ml. of anhydrous pyridine there are added 10 ml. of acetoformic anhydride (prepared according Beilstein 2, 165) and the reaction mixture is maintained at 60° C. for about one hour.

After evaporation in vacuo the residue is extracted with chloroform and the chloroformic phase is at first washed with water, then evaporated to dryness. The residue is taken up with an ethanol-diethyl ether mixture (1:9) to obtain the vintiamol O-formate (trans-form), identical to the compound described in Example 7.

EXAMPLE 9

To a solution of 4.58 g. of vintiamol (trans-form) in 30 ml. of anhydrous pyridine there are added 5.1 g. of acetic anhydride and the reaction mixture is maintained at room temperature for 12 hours. By operating as in Example 2, the vintiamol O-acetate (trans-form) is obtained; M.P. 124–127° C. Yield: 2.65 g.

500 mg of the compound so obtained are dissolved in little water and treated with hydrochloric acid. The solution is evaporated and the residue is recrystallized from ethanol. Thus the hydrochloric acid addition salt of vintiamol O-acetate (trans-form) is obtained; M.P. 123–125° C.

In analogous manner, but operating with oxalic acid in alcoholic solution, the corresponding oxalic acid addition salt of vintiamol O-acetate (trans-form) is obtained; M.P. 144–145° C. Similarly the hydrobromic, hydriodic, sulphuric, phosphoric, tartaric, lactic and methanesulphonic acid addition salts are obtained.

EXAMPLE 10

To a solution of 2.29 g. of vintiamol (trans-form) in 10 ml. of anhydrous pyridine there are added 1.86 g. of valeric anhydride and the reaction mixture is maintained at room temperature for 12 hours. By operating as in Example 2, the vintiamol O-valerate (trans-form) is obtained; M.P. 121–124° C. Yield: 2.15 g.

Analogously vintiamol O-propionate (trans-form), M.P. 106–109° C., vintiamol O-benzoate (trans-form), M.P. 151–153° C. and vintiamol O-hemisuccinate (trans-form), M.P. 149–152° C. (dec.) are obtained.

EXAMPLE 11

(a) Vintiamol O-β-cyanethylphosphate (cis-form)

To a solution of 6.18 g. of vintiamol (cis-form) in 1200 ml. of anhydrous pyridine there are added 30 ml. of a molar solution of β-cyanethylphosphate in pyridine, then the solvent is distilled off in vacuo at 40° C. until the volume of the solution is reduced to 150 ml. To this solution there are added 18.6 g. of N,N′-dicyclohexylcarbodiimide and the resulting mixture is maintained 96 hours at room temperature. The excess of N,N′-dicyclohexylcarbodiimide is destroyed by addition of water, then the mixture is concentrated in vacuo to dryness and the residue is taken up with water. After filtration of the by-products the solution is concentrated until its volume is reduced to about 20 ml., then distilled at 40° C. in vacuo to dryness. There is so obtained the vintiamol O-β-cyanethylphosphate (cis-form); M.P. 173–176° C. (dec.). Yield: 6.6 g.

(b) Vintiamol O-phosphate (cis-form)

A solution of 1.09 g. of vintiamol β-cyanethylphosphate (cis-form) in 50 ml. of a 0.1 N solution of sodium hydroxide is heated at 50° C. for 3 minutes. To the solution cooled to 10° C. there are added 50 ml. of a 0.1 N solution of hydrochloric acid and the crystalline product is recrystallized from water at 80° C. There is so obtained the vintiamol O-phosphate (cis-form); M.P. 175–180° C. (dec.). Yield: 0.45 g.

EXAMPLE 12

(a) Vintiamol O-β-cyanethylphosphate (trans-form)

To a solution of 8.24 g. of vintiamol (trans-form) in 150 ml. of anhydrous pyridine there are added 40 ml. of a molor solution of β-cyanethylphosphate and 24.8 g. of N,N′-dicyclohexylcarbodiimide. By operating as in Example 11(a) there are obtained 7.6 g. of vintiamol O-β-cyanethylphosphate (trans-form); M.P. 181–183° C.

(b) Vintiamol O-phosphate (trans-form)

To a suspension of 5.45 g. of vintiamol O-β-cyanethylphosphate (trans-form) in 257 ml. of water there are added 30 ml. of an aqueous N solution of sodium hydroxide. The reaction mixture is heated at 50° C. for 3 minutes, then filtered and poured on a column of 25 ml. of Dowex 50–W–X4 (100–200 mesh). After elution with 250 ml. of water the solution thus obtained is evaporated at 50° C. There is so obtained the vintiamol O-phosphate (trans-form), which, after crystallization from water at 60° C., melts at 150–153° C. (dec.). Yield: 2.86 g.

We claim:
1. A member selected from the group consisting of
(a) a vintiamol ester of formula:

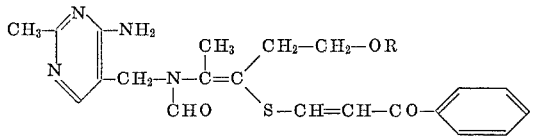

wherein R is selected from the group consisting of the orthophosphate group and a hydrocarbon acyl group having from 1 to 9 carbon atoms selected from the group consisting of alkanoyl, aroyl, cycloalkylalkanoyl, phenylalkanoyl and acyl residues of aliphatic dicarboxylic acids; and (b) nontoxic acid addition salts thereof.

2. The cis form of vintiamol ester according to claim 1.
3. The trans form of a vintiamol ester according to claim 1.
4. Vintiamol O-formate.
5. The cis form of vintiamol O-formate.
6. Vintiamol O-acetate.
7. The cis form of vintiamol O-acetate.
8. Vintiamol O-propionate.
9. The cis form of vintiamol O-propionate.
10. Vintiamol O-valerate.
11. The cis form of vintiamol O-valerate.
12. Vintiamol O-benzoate.
13. The cis form of vintiamol O-benzoate.
14. Vintiamol O-hemisuccinate.
15. The cis form of vintiamol O-hemisuccinate.
16. Vintiamol O-phosphate.
17. The cis form of vintiamol O-phosphate.
18. The trans form of vintiamol O-valerate.

19. A compound of formula:

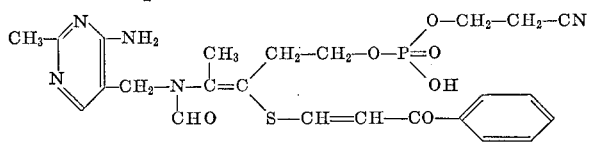

20. The cis form of a compound according to claim 19.

References Cited

UNITED STATES PATENTS

| | | | |
|---|---|---|---|
| 3,320,258 | 5/1967 | Hirano et al. | 260—256.5 |
| 3,401,162 | 9/1968 | Fusco et al. | 260—240 |
| 3,429,883 | 2/1969 | D'Alo et al. | 260—256.5 |

OTHER REFERENCES

Pagani et al., Gazz. Chim. Ital., vol. 97, pp. 1770 to 1787, December 1967.

JOHN D. RANDOLPH, Primary Examiner

U.S. Cl. X.R.

260—240 P; 424—251